Oct. 1, 1946.    C. G. LAMB    2,408,659
AIR FILTER
Filed April 7, 1944    2 Sheets-Sheet 2
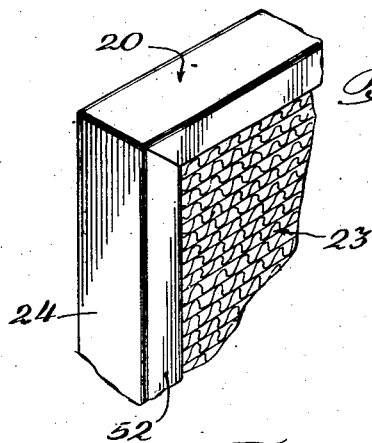
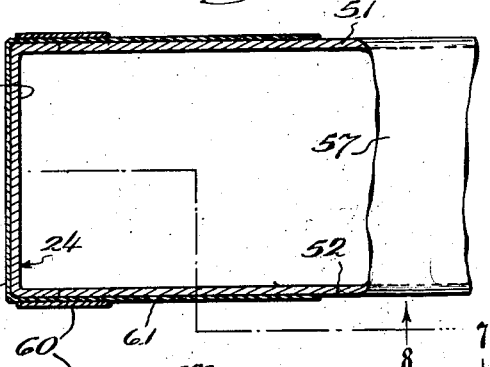
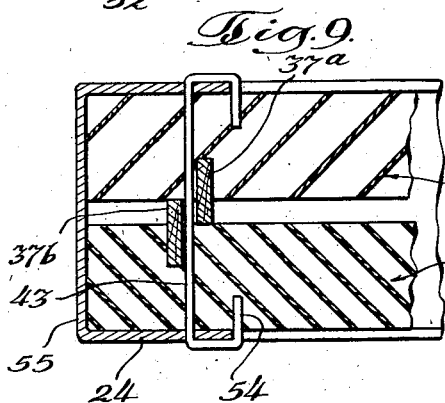
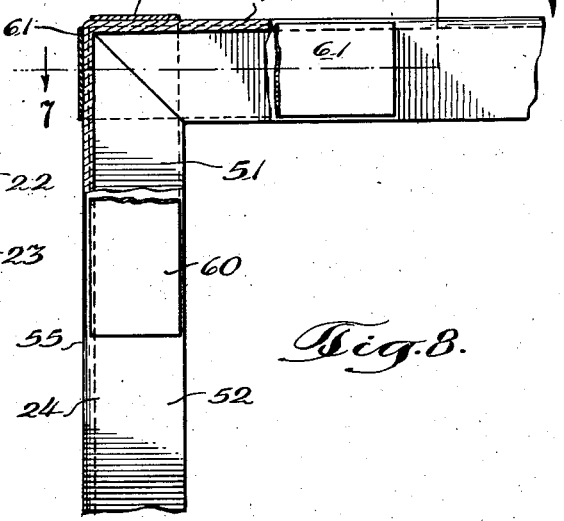
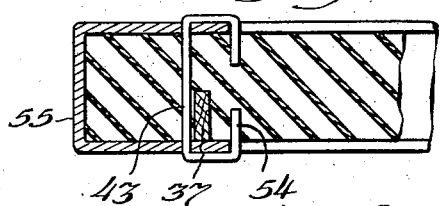
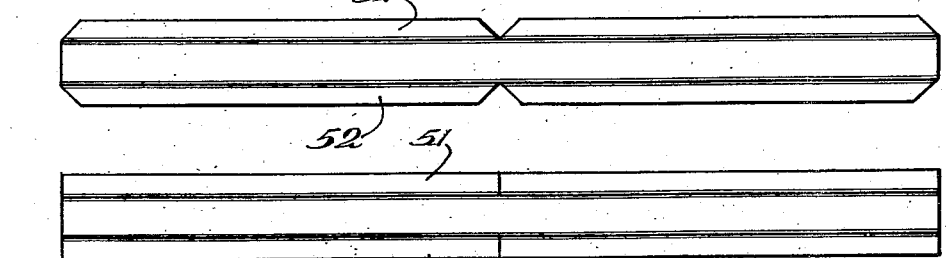
Inventor
Charles G. Lamb
By McCaleb, Hewitt & Dickinson
attorney Patented Oct. 1, 1946

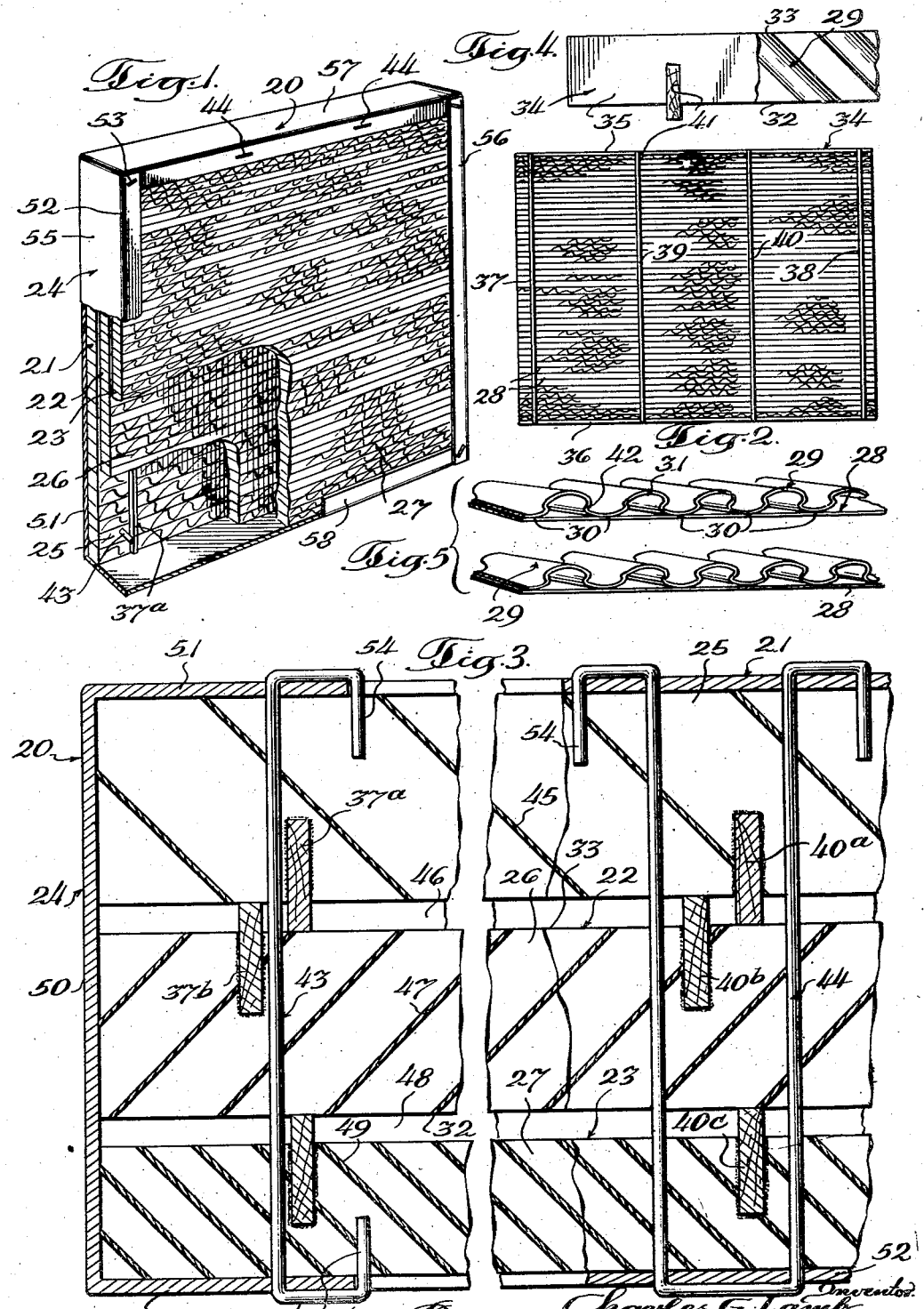

2,408,659

UNITED STATES PATENT OFFICE 2,408,659

AIR FILTER

Charles G. Lamb, Elmhurst, Ill.

Application April 7, 1944, Serial No. 529,909

15 Claims. (Cl. 183—75)

The present invention relates to air filters, and is particularly concerned with air filters of the type having a porous cellular structure adapted to permit the relatively free flow of air through the filter, the porous structure being provided with an adhesive compound which is adapted to contact and entrap the dust and other foreign materials in the air passing through the filter.

The filters of the prior art of this character are best exemplified by the U. S. patent to H. S. Kaiser, No. 2,019,186, issued October 29, 1935, exemplifying a structure which the applicant has been manufacturing for a number of years.

One of the objects of the present invention is the provision of an improved filter structure of this character, by means of which the deficiencies and disadvantages of the filters of the prior art of this character may be eliminated. For example, in the filter of the Kaiser patent all of the ridges of the corrugations are secured at their apices to the adjacent flat layers of paper by means of adhesive, for the purpose of reinforcing the structure and making a unitary assembly. One of the disadvantages of such a filter structure is that such filters are sometimes subjected to the action of an atmosphere of low humidity, the drying action of which removes moisture from the paper, and this causes the paper to contract; but, as the corrugations are all secured to the adjacent flat strips of paper, contraction of the corrugations is resisted until one of the layers of the filter breaks loose from an adjacent layer and forms a relatively large crack through the filter.

Under other conditions, when the filter is subjected to a humid atmosphere, the filter may take up moisture, and the corrugations may expand; and it has been found that such filters tend to buckle outward from their frames and to become deformed when subjected to excessive humidity.

One of the objects of the invention is the provision of an improved filter structure, the shape and form of which is not destroyed either by excessive humidity, resulting in expansion, or excessive dryness, resulting in contraction.

Another object of the invention is the provision of an improved filter structure, the parts of which are held together in such manner that the filter member, although relatively thin in its transverse dimension, is always held in perfectly flat and plane condition, without buckling, and without the formation of cracks or apertures other than those passages that are formed by the corrugations themselves.

Another object of the invention is the provision of an improved filter for air which is adapted to be provided with an adhesive compound of a particular character that is carried by the oil and absorbed by the structure of the filter in such manner that as dust and dirt or other foreign material is accumulated on the surfaces of the filter, additional oil, or a liquid component of the adhesive compound, is carried to the surface of the dust on the filter by capillary action, thereby maintaining the external effective surface of the filter in its most efficient condition at all times.

Another object of the invention is the provision of an improved air filter, the structure of which is capable of such economical manufacture that when the filter becomes filled with a predetermined amount of dirt or other foreign material it may be thrown away, since it is more economical to provide a new filter of this type than to endeavor to clean a used and dirty filter of this construction.

Another object of the invention is the provision of an improved filter assembly having a very high efficiency in the removal of dust and other foreign materials from the air, and having a very low resistance to the passage of air.

Another object of the invention is the provision of an improved air filter which is sturdy, simple in its structure, and efficient in operation, and which is adapted to increase in efficiency of operation instead of decreasing in efficiency as the use of the filter progresses.

The outstanding and salient features of the filters constructed according to the invention may be summarized as follows:

1. Clean air

The present filter structure, with its automatic maintenance of high adhesive efficiency on all of the maximum area, assures definite dust contact with a maximum of effective filtering surfaces, resulting in the highest efficiency of removal of foreign materials of all kinds from the air.

2. Free air flow

The present filter structure, having a uniform cell construction, with relatively large openings, gives uniform air distribution and uniform dust collecting action throughout the full cross sectional area of the stream of air, while permitting the air to flow freely, with a minimum amount of resistance.

3. Mechanical strength

The present filters, although being constructed so economically that they may be replaced rather than cleaned, are structurally strong and so reinforced mechanically that they are rigid in their environment and there is no danger of any part of them, or of the collected dust, breaking away and being carried into the air stream.

4. Economy

The present filters provide more filtering surface per dollar investment in materials and labor than any of the devices of the prior art, resulting in greater operating economy.

5. High collecting capacity

Due to the structure of the present filter and its actual impregnation with a large quantity of dust collecting adhesive, which is stored in the fibrous structure and given up by capillary action to the dust collected, the filters are adapted to retain a larger amount of dust than the devices of the prior art, and have a longer useful life.

6. Neutral effect on air

Due to the use of the particular structure and adhesive, the action of the filter on the air which passes through it is neutral and odorless, and there is no possibility of detrimental materials being placed in the air stream issuing from the present filters by reason of the use of this structure.

Other objects and advantages of the invention will be apparent from the following description and the accompanying drawings, in which similar characters of reference indicate similar parts throughout the several views.

Referring to the drawings, of which there are two sheets:

Fig. 1 is a view in perspective of a three-cell filter unit embodying the invention;

Fig. 2 is a rear elevational view of one of the filter cells;

Fig. 3 is a fragmentary enlarged sectional view, taken through one of the edge portions of the filter of Fig. 1, showing the details of construction;

Fig. 4 is a fragmentary top plan view of the filter cell of Fig. 2;

Fig. 5 is an exploded view of the corrugated and plane sheets of fibrous material of which the filter cells are constructed;

Fig. 6 is a fragmentary view in perspective of the corner structure of a filter unit similar to Fig. 1, utilizing mitred joints;

Fig. 7 is a horizontal sectional view of the corner frame structure of Fig. 6;

Fig. 8 is a sectional view of Fig. 1, showing the mode of fastening the parts of the frame together at the corner in this structure;

Fig. 9 is an enlarged view similar to Fig. 3 of a two-cell filter unit;

Fig. 10 is an enlarged view similar to Fig. 3 of a one-cell filter unit.

Fig. 11 is a plan of the pattern for the external frame of the unit of Fig. 6, on a reduced scale; and Fig. 12 is a similar plan of the pattern utilized for the frame of Fig. 1.

Referring to Fig. 1, this is a view in perspective of a three cell filter unit constructed according to the invention, the unit being indicated in its entirety by the numeral 20.

The principal parts of the unit comprise the cell 21, cell 22, and cell 23, and the external frame, indicated in its entirety by the numeral 24. Each of the cells is preferably similar in structure, but the cells are preferably provided with passages graduated in size, as shown in Fig. 3, the size of the passages decreasing from the inlet side or top of the filter unit of Fig. 3 to the outlet or bottom of the unit in Fig. 6. Thus, in the three cell unit the cell 21 is provided with the relatively large passages 25, while the cell 22 is provided with relatively smaller passages 26 that are intermediate in size between the passages 27 of the cell 23 and the passages 25 of the cell 21.

The structures of the separate cells of which the unit 20 is composed are substantially similar except for the size of the passages. These cells are preferably constructed of fibrous material, such as corrugated single face straw paper. Two pieces of such single face corrugated paper are shown in Fig. 5, the flat or plane piece of paper 28 being known as the liner, and the other piece 29 being known as the corrugated paper.

The specific material or type of paper of which the filter structure may be constructed for different purposes may be varied. For example, the liner may be of straw paper and the corrugated sheet of chip paper, such material being called "straw and chip"; or the liner may be made of chip paper and the corrugated sheet of straw paper, such material being called "chip and straw"; but I prefer to utilize the soft material throughout, the liner being of straw paper and the corrugated sheet being of straw paper, this material being known as "straw and straw."

In order to maintain the corrugations, the corrugated sheet 29 has the apices of the corrugations, which appear on the lower side of the corrugated sheet in Fig. 2, preferably secured to the liner 28 by glue preferably throughout the full length of these particular corrugations, such as, for example, at the points 30.

In some embodiments of the invention a number of spaced points of securement 30 may be utilized instead of a line, but the most economical form of construction is the use of glue for the engagement between the adjacent apices of the corrugations and the liner 28.

Various types of glue may be used, preferably of the waterproof type, and a sodium silicate adhesive is preferably employed wherever adhesive is required throughout the filter cells. Aside from the use of adhesive to secure the adjacent apices of the corrugated sheet 29 to the liner 28, the balance of the straw paper is unsized and in its most absorbent fibrous condition, but is free from lint or loose particles of paper or fibers.

The shape of the corrugations 31 may be varied considerably, but in general the upper portions of the corrugations 31 are substantially cylindrical, and the lower portions of these corrugations are also substantially cylindrical, this shape being varied as the corrugations are subjected to pressure, tending to flatten them slightly, as shown in Fig. 5, or the depth of the corrugations is elongated as the corrugations are permitted to expand.

The direction in which the corrugations extend with respect to the outer plane surfaces 32 and 33 of each cell is preferably at an angle other than a right angle, such as, for example, 45 degrees to either of the planes of the external surfaces of the cell.

Thus, in the manufacture of such cells, the single face corrugated paper is cut into narrow strips of suitable width, such as, for example five-eighths of an inch to one inch in thickness, depending upon the size of the passages in the corrugations. The dimensions given are merely exemplary of those which have been used in practice, as the cells with the relatively large corrugations have been made seven-eighths of an inch in thickness, the intermediate cells 22 have been made three-quarters of an inch in thickness, and the cells with the smallest passages five-eighths of an inch in thickness. The larger the passages, the longer they may be made without interposing too much resistance of the flow of the air stream.

The single face corrugated strips having been cut with the corrugated passages extending at a predetermined angle, such as, for example, forty-five degrees, they are then stacked one upon the other, with the liners all facing in the same direction, and enclosed and secured in a frame indicated in its entirety by the numeral 34 in Fig. 2.

Referring to the angle at which the corrugations extend, this may be varied, as an angle greater than forty-five degrees or closer to the plane of the external surface of the cell, might be used to cause the air to impinge still more directly upon the side surfaces of the corrugations, but the angle of forty-five degrees is preferred, as it has been found to be efficient, and it makes the filter symmetrical, and permits the arrangement of strips by workmen without danger of confusion as to the direction in which a corrugation must extend.

The frame 34 preferably comprises a plurality of thin, light wooden strips, such as the upper frame member 35, the lower frame member 36, the end transverse frame members 37, 38, and the intermediate transverse frame members 39, 40.

The size and shape of the end frame members 35, 36 are preferably the same as the size and shape of the single face corrugated paper strips of which the cell is made. These end frame members 35, 36 are located on the top and the bottom of the stack of corrugated strips to reinforce these sides and hold the corrugated strips together.

The end frame members 35, 36 are provided with a plurality of slots 41, preferably rectangular in shape, and all extending into the same edge of the upper and lower frame members 35, 36 a distance which may be substantially half the width of the end frame members 35, 36. The purpose of the slots 41 is to receive edgewise the transverse frame members 37—40, the end portions of which are frictionally secured in the slots 41 in the end frame members 35, 36 and also secured by means of a suitable adhesive, such as sodium silicate.

The locations of the slots 41 and the transverse frame members 37—40 may be varied, but the outermost transverse frame members 37, 38 are preferably located quite close to the edges of the cell, such as, for example, within an inch or a half inch, a distance of five-eighths of an inch to the center of the transverse frame members 37, 38 from the outer edge having been used in practice. The other intermediate transverse frame members 39, 40 may be symmetrically located with respect to the outermost transverse frame members 37, 38, and these should be sufficient in number and regularly spaced to provide adequate stiffness and to place the single face corrugated strips under an initial compression.

In order to make a space for the transverse frame members 37—40, the corrugated single face strips of paper 29 must themselves also be provided with slots 41 which coincide in location with the slots 41 in the end frame members 35, 36, and the slots 41 of the corrugated strips also have their walls in frictional engagement with the transverse frame members 37—40.

In some embodiments of the invention I may dispense with adhesive, relying entirely upon frictional engagement, but I prefer at present to utilize the silicate adhesive throughout the length of the transverse strips 37—40 for engagement with each and every edge of paper bordering the slots 41 in the corrugated strips and the end frame members 35, 36.

This can be accomplished by dipping the wood strips in the silicate of soda solution before the wood strips are placed in their slots. The length of the transverse frame members 37—40 is so predetermined with respect to the stack of corrugated strips 29 that the corrugations are initially slightly deformed or flattened, being placed under an initial resilient deforming pressure when assembled as shown in Fig. 4.

This produces a slight reverse curvature at 42 in the intermediate or side wall of each corrugation, Fig. 2. It also permits each corrugation to expand to take up all the space necessary, as the material of which the corrugations is made contracts; or if the material of which the corrugations is made expands, due to excessive humidity, then the corrugations may shift and become compressed in a slightly greater degree to take up the expansion of the material.

In some embodiments of the invention the end frame members 35, 36 may be omitted or they may be replaced by double-faced corrugated strips of cardboard.

One of the most important features of the present invention as distinguished from certain prior art devices, exemplified in the above-mentioned Kaiser patent, lies in the fact that the successive layers of single face corrugated paper strips are not attached together at the points of contact between the ridges 31 and the adjacent liner or flat paper 28.

It is by virtue of this detachment and the structure and arrangement of the parts previously described that the present filter cells are adapted to withstand excessively humid conditions which would cause the filter cells of the prior art to expand and buckle outward.

The present filter structures are also adapted to withstand excessively dry conditions which result in contraction of the material without causing the formation of large cracks because the contraction is taken up by the initial compression of the corrugations and by the uniform distribution of this contraction throughout the full height of the stack of corrugated strips.

Where the corrugated strips are all secured together at their ridges to the adjacent flat sheets of paper, they resist contraction until one or more of the corrugations break loose from their adjacent flat strips and a large crack is formed, through which air passes quite freely without filtering action. This is avoided and eliminated by the present invention.

The transverse frame members 37—40, except in the single cell unit, are preferably wider than the depth of the grooves 41 so that they project from the face of the filter cell, that is, from the paper and the end frame members 35 and 36, by a predetermined amount, such as, for example, from three-sixteenths of an inch to five-sixteenths of an inch, to space one cell from the other in an assembly such as Fig. 3.

The location of the transverse frame members 37—40 in the different cells 21—23 of an assembly is preferably such that the corresponding frame members are adjacent each other but slightly offset from each other. Thus, in Fig. 3 the transverse frame members 37a and 37b are close to each other, but slightly offset laterally so that the securing device or staple 43 may pass between them, and the transverse frame members 40a, 40b, and 40c are close enough together so that they may be embraced by a U-shaped staple member 44.

When the present filter unit is to embody more than one cell, cells having corrugations of different size preferably are associated with each other, and the directions in which the corrugations extend are so arranged that the corrugations and passages of one cell extend transversely to the corrugations and passages of the next cell. Thus the air passes in at the top of Fig. 3 and, as shown on the drawings, is directed downwardly toward the right, impinging upon the right side 45 of each passage in the corrugations and passing from the passage into the dead air space 46.

From the space 46 the air impinges upon the oppositely directed walls of the passages 26 in the cell 22, impinging upon the left side 47 of these passages, and passing downward into the open space 48 between the cells 22 and 23.

From thence the air goes into the passages 27 of the cell 23, impinging on the right side 49 of each of the walls of the passages 27 and being directed diagonally toward the right. The use of the dead air spaces 46 and 48 between the cells permits the air to expand somewhat in these spaces, and some of the velocity energy is changed into pressure energy, with the resultant tendency toward deposit of dust and other foreign matter that is carried by the air.

The larger cell openings in the first cell 21 of the filter unit serve to remove the greater particles of dust from the air without seriously impairing its velocity, and thereafter the air impinges upon the cell 22, having still smaller passages, and later upon the cell 23, with the smallest passages, to give a maximum amount of contact between the adhesive covered surface of the filter unit and the air passing through it.

A small amount of the velocity energy of the air is thus transformed into pressure energy, and the air is caused to impinge upon the side walls of the cells successively so that a maximum amount of air comes in contact with the adhesive covered surface, and a maximum amount of dust and other foreign matter is removed from the air.

The transverse frame members 37—40 are preferably always turned inward, as shown in Fig. 3, so that the exterior surface of the unit is uniform in appearance. This renders it necessary to have the frame members 37a and 37b extending towards each other to establish the space 46 between the cells 21 and 22.

The assembly of cells or a single cell, if such is desired, is preferably provided with an exterior frame 24 made of chip cardboard. This frame may be made of one continuous strip of cardboard, which is formed into channel shape by providing it with a relatively wide body 50 and a pair of narrow inwardly directed flanges 51 and 52 extending at right angles to the body 50.

The body 50 is of sufficient width so that the flanges 51, 52 engage the outer surfaces of the assembly. In the embodiment of Fig. 1 the flanges 51, 52 are not mitered at the corners, and therefore they overlap at these corners and may be secured together by means of a suitable wire staple 53, which may pass through from the front of the filter unit to the back, and which may secure both flanges 51, 52 at each corner.

This staple may be the staple 43, shown in Fig. 3, which extends through the filter cells 21—23, and is located between the frame members 37, and is bent over outside the flanges 51, 52 and provided with the inwardly extending end portion 54. Additional staples 43 may be located at various other points longitudinally of the side 55 of the frame 24 and also on the side 56 of the frame. The staples 44 of substantially U shape are located in such manner that they embrace the frame members 39 or the frame members 40, as the case may be, and so that they pass through the flanges 51, 52 of the upper side 57 of the frame, and others in the lower side 58 of the frame.

These U-shaped staples 44 are also bent laterally outside the flange 51, and have inwardly extending end portions 54.

One of the forms of pattern for the frame of Fig. 1 is shown in the plan view of Fig. 12.

Referring to Fig. 6, this is a fragmentary view in perspective of a modified form of external frame, in which the corners of the flanges 51, 52 are mitered. The plan of the pattern for this type of frame is shown in Fig. 11, two of these patterns being necessary for a complete frame.

With the mitered type of frame of Fig. 6 the corner portions of the flanges 51, 52 do not overlap, and the frames are of uniform thickness, without any increase in thickness at the corners, due to such overlap.

Such an external frame is preferably secured in place by means of a pair of strips of adhesive linen tape, the two strips being of substantially U shape when applied, and being applied at right angles to each other. Thus, one strip 60 of adhesive tape may start on the flange 51 of the top side of the frame 57, extend across the body of the side 55 of the frame, and then engage along the flange 52 of the top side 57.

The other adhesive strip 61 may start by extending longitudinally of the flange 51 on the side 55 of the frame, then forwardly across the body of the side 57, and downwardly along the flange 52 of the side 55 at the upper left hand corner.

Referring to Fig. 9, this is an enlarged fragmentary view, similar to Fig. 3, showing a two cell unit embodying the cells 22 and 23 of Fig. 3.

Fig. 10 is a similar view, showing a one cell unit, and in this case the transverse frame members 37—40 are made narrower so that their outer surfaces are flush with the surface of the cellular body.

One of the most important features of the invention resides in the use of a suitable type of adhesive adapted to be absorbed by the fibrous paper of which the cells are made and to provide the surface with an adhesive having a constantly tacky condition for gathering dust.

This adhesive is preferably applied after the cells have been completed, and preferably after they have been enclosed in a suitable frame 24; but, if desirable, the separate cells may be impregnated before being enclosed in the frame.

The adhesive compound used is preferably a petroleum product comprising a highly refined cylinder stock oil which is thickened by the addition of a soap oleate. This mixture is semi-solid at room temperature, but will pour out of the barrel, and it is preferably heated to approximately 180 degrees F. in order to increase its liquidity so that it may be applied to the cells.

It is preferably applied by spraying, and an excess of the adhesive is applied so that the oil may penetrate into the paper, and the heavy grease particles provided by the soap oleate lie on the surface of the paper throughout all of the passages of the corrugations and on the exposed surfaces of the liners.

The grease on the surface is the media for catching the first layer of dust, and thus a very efficient filter is provided from the beginning of its use.

As distinguished from the devices of the prior art which do not utilize the same structure or adhesive, the efficiency of my filter increases as dust is collected. The dust collected dries the grease and absorbs oil, and additional oil is brought to the surface to wet the collected dust, by capillary action through the fibers of the paper. Ceramic or metallic dust is surrounded by the oil, causing it to adhere to the grease and to the cellular structure, and the fibrous dust absorbs the oil; but in any event, the oil at the surface is constantly replaced by oil from the body of the paper, by capillary action.

This keeps the dusty filter surface constantly oily, and such filters have been found to be in efficient oily condition at the surface until they have been used so long that the passages have been stopped with dust.

Naturally, filters should be replaced before this occurs, but this is evidence of the efficient action of replacement of the oil at the surface by the oil which is stored in the pores of the paper.

In ordinary use it is considered advisable to replace filters for house use once each heating season; and upon railroad use, where filters are subjected to the hardest condition of use, it may be necessary to replace filters after a plurality of relatively long trips.

The operation of the present filters will be apparent from the foregoing description and statements of the functions of the various parts.

The present filters may be constructed very economically and sold so cheaply that it is more economical to replace them than to clean them. A minimum amount of metal is utilized in the construction, such as, for example, the wire staples, and in some cases I may dispense also with the use of the staples.

The present filters are very efficient at the beginning of their use, and their efficiency constantly increases, as the accumulation of dust on the walls of the paper gives the cell a surface which is still moist and tacky and which has a very desirable surface from the point of view of entrapping dust and other foreign materials.

The filter imposes a minimum amount of resistance to the flow of the air stream, and is very strong structurally so that there is no tendency for parts of the filter to break off and be driven down into the air stream. The oily adhesive and the paper of which the filter is constructed are without undesirable odor, and are practically neutral with respect to the question of affecting the character of the air passing through the filter.

The present filters are adapted to be used under excessively humid conditions because they will withstand expansion without buckling, and they can be used under excessively dry conditions because any resultant contraction is taken up in all of the spaces between the multiplicity of single face corrugated strips, without formation of any big cracks.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A replaceable filter cell for air filters, comprising a plurality of narrow strips of single face corrugated paper arranged in a stack, with the liners of one strip engaging the corrugations of the next, but unattached thereto, and a supporting frame for maintaining said strips in a unit, comprising a pair of end frame members, one at each end of the stack, and a plurality of transverse frame members secured to said end frame members and engaging said corrugated strips to hold them in a unitary assembly and means for impregnating said filter cell and providing its external surface with a tacky material, comprising a sprayed and absorbed supply of adhesive compound, said transverse frame members being located in slots in the corrugated strips and being in frictional engagement with the said corrugated strips at the walls of said slots, the said transverse frame members extending from the face of the filter cell from said slots for the purpose of engaging additional filter cells and spacing the present filter cell from additional filter cells to provide a dead air space between this cell and adjacent cells.

2. A replaceable filter cell for air filters, comprising a plurality of narrow strips of single face corrugated paper arranged in a stack, with the liners of one strip engaging the corrugations of the next, but unattached thereto, and a supporting frame for maintaining said strips in a unit, comprising a pair of end frame members, one at each end of the stack, and a plurality of transverse frame members secured to said end frame members and engaging said corrugated strips to hold them in a unitary assembly and means for impregnating said filter cell and providing its external surface with a tacky material, comprising a sprayed and absorbed supply of adhesive compound, said transverse frame members comprising rigid strips of material having a predetermined tensile strength located in slots in the face of said filter cell and projecting forwardly of the face from said slots for engagement with adjacent filter cells to provide a dead air space between this cell and adjacent cells, said transverse frame members and end frame members placing the corrugations of said strips under a predetermined resilient compression whereby they are adapted to become opened to a greater degree upon contraction of the material of which the corrugated strips are made.

3. A replaceable filter cell for air filters, comprising a plurality of narrow strips of single face corrugated paper arranged in a stack, with the liners of one strip engaging the corrugations of the next, but unattached thereto, and a supporting frame for maintaining said strips in a unit, comprising a pair of end frame members, one at each end of the stack, and a plurality of transverse frame members secured to said end frame members and engaging said corrugated strips to hold them in a unitary assembly and means for impregnating said filter cell and providing its external surface with a tacky material, comprising a sprayed and absorbed supply of adhesive compound, said tranverse frame members comprising rigid strips of material having a predetermined tensile strength located in slots in the face of said filter cell and projecting forwardly of the face from said slots for engagement with adjacent filter cells to provide a dead air space between this cell and adjacent cells, said transverse frame members being located in slots in the corrugated strips and being in frictional engagement with the said corrugated strips at the walls of said slots, said transverse frame members and end frame members placing the corrugations of said strips under a predetermined resilient compression whereby they are adapted to become opened to a greater degree upon contraction of the material of which the corrugated strips are made.

4. A filter assembly comprising a plurality of filter cells, each of said filter cells consisting of a stack of relatively narrow strips of single face corrugated absorbent paper, and each of said cells having a pair of end frame members, one at each end of the stack of paper strips, and a plurality of transverse frame members secured to said end frame members and holding them in engagement with the corrugated strips, said transverse frame members projecting outwardly from one cell toward the other cell for the purpose of spacing the cells from each other to provide a relatively dead air space between the cells, and means for fixedly secured a plurality of said filter cells together with the transverse frame members of one cell engaging the face formed by the edges of the corrugated strips of the other cells.

5. A filter assembly comprising a plurality of filter cells, each of said filter cells consisting of a stack of relatively narrow strips of single face corrugated absorbent paper, and each of said cells having a pair of end frame members, one at each end of the stack of paper strips, and a plurality of transverse frame members secured to said end frame members and holding them in engagement with the corrugated strips, said transverse frame members projecting outwardly from one cell toward the other cell for the purpose of spacing the cells from each other to provide a relatively dead air space between the cells, the corrugations on said strips extending transversely on one cell with respect to the direction of the corrugations on the other next adjacent cell, and means for fixedly securing a plurality of said filter cells together with the transverse frame members of one cell engaging the face formed by the edges of the corrugated strips of the other cells.

6. A filter assembly comprising a plurality of filter cells, each of said filter cells consisting of a stack of relatively narrow strips of single face corrugated absorbent paper, and each of said cells having a pair of end frame members, one at each end of the stack of paper strips, and a plurality of transverse frame members secured to said end frame members and holding them in engagement with the corrugated strips, said transverse frame members projecting outwardly from one cell toward the other cell for the purpose of spacing the cells from each other to provide a relatively dead air space between the cells, and an external frame for said assembly, comprising a layer of cardboard on each of the edges of the assembly, said layer having inwardly extending narrow flanges on each of the faces of said assembly.

7. A filter assembly comprising a plurality of filter cells, each of said filter cells consisting of a stack of relatively narrow strips of single face corrugated absorbent paper, and each of said cells having a pair of end frame members, one at each end of the stack of paper strips, and a plurality of transverse frame members secured to said end frame members and holding them in engagement with the corrugated strips, said transverse frame members projecting outwardly from one cell toward the other cell for the purpose of spacing the cells from each other to provide a relatively dead air space between the cells, and an external frame for said assembly comprising a layer of cardboard on each of the edges of the assembly, said layer having inwardly extending narrow flanges on each of the faces of said assembly, and a plurality of metallic members passing through the inwardly extending flanges and through the cells and being bent over to retain the frame and cells in assembled relation.

8. A filter assembly comprising a plurality of filter cells, each of said filter cells consisting of a stack of relatively narrow strips of single face corrugated absorbent paper, and each of said cells having a pair of end frame members, one at each end of the stack of paper strips, and a plurality of transverse frame members secured to said end frame members and holding them in engagement with the corrugated strips, said transverse frame members projecting outwardly from one cell toward the other cell for the purpose of spacing the cells from each other to provide a relatively dead air space between the cells, and an external frame for said assembly comprising a layer of cardboard on each of the edges of the assembly, said layer having inwardly extending narrow flanges on each of the faces of said assembly, and a plurality of metallic members passing through the inwardly extending flanges and through the cells and being bent over to retain the frame and cells in assembled relation, predetermined of said transversely extending frame members being offset from each other, and the metallic members extending between said latter frame members.

9. A filter assembly comprising a plurality of filter cells, each of said filter cells consisting of a stack of relatively narrow strips of single face corrugated absorbent paper, and each of said cells having a pair of end frame members, one at each end of the stack of paper strips, and a plurality of transverse frame members secured to said end frame members and holding them in engagement with the corrugated strips, said transverse frame members projecting outwardly from one cell toward the other cell for the purpose of spacing the cells from each other to provide a relatively dead air space between the cells, and an external frame for said assembly comprising a layer of cardboard on each of the edges of the assembly, said layer having inwardly extending narrow flanges on each of the faces of said assembly, and a plurality of metallic members passing through the inwardly extending flanges and through the cells and being bent over to retain the frame and cells in assembled relation, certain of said metallic members being provided with a pair of legs traversing said assembly, and said legs embracing predetermined transversely extending frame members.

10. A filter cell comprising a plurality of narrow strips of single face corrugated paper arranged in a stack, with corrugations of each sheet engaging the liner of the adjacent sheet, and the corrugations extending diagonally with respect to the edges of said strips, said corrugated sheets being provided with a plurality of aligned slots and a plurality of transverse frame members, one for each of said slots, said transverse frame members being frictionally engaged in said slots to hold the corrugated strips in assembled relation, the said transverse frame members being located in the face of said filter cell and projecting forwardly from the face of said cell to space the instant cell from any adjacent cell, and form a dead air space between them.

11. A filter cell comprising a plurality of narrow strips of single face corrugated paper arranged in a stack, with corrugations of each sheet engaging the liner of the adjacent sheet, and the corrugations extending diagonally with respect to the edges of said strips, said corrugated sheets being provided with a plurality of aligned slots and a plurality of transverse frame members, one for each of said slots, said transverse frame members being frictionally engaged in said slots to hold the corrugated strips in assembled relation, the said transverse frame members being located in the face of said filler cell and projecting forwardly from the face of said cell to space the instant cell from any adjacent cell, and form a dead air space between them, and a layer of adhesive carried by said frame members and adapted to engage and secure the edges of all parts of the corrugated strips in said slots to said frame members.

12. A filter cell comprising a plurality of narrow strips of single face corrugated paper arranged in a stack, with corrugations of each sheet engaging the liner of the adjacent sheet, and the corrugations extending diagonally with respect to the edges of said strips, said corrugated sheets being provided with a plurality of aligned slots and a plurality of transverse frame members, one for each of said slots, said transverse frame members being frictionally engaged in said slots to hold the corrugated strips in assembled relation, the said transverse frame members being located in the face of said filter cell and projecting forwardly from the face of said cell to space the instant cell from any adjacent cell, and form a dead air space between them, and a layer of adhesive carried by said frame members and adapted to engage and secure the edges of all parts of the corrugated strips in said slots to said frame members, all of said frame members being secured at one end to an end frame member engaging the end of the stack and at the other end to a second end frame member engaging the other end of the stack of corrugated strips.

13. A filter cell comprising a plurality of narrow strips of single face corrugated paper arranged in a stack, with corrugations of each sheet engaging the liner of the adjacent sheet, and the corrugations extending diagonally with respect to the edges of said strips, said corrugated sheets being provided with a plurality of aligned slots and a plurality of transverse frame members, one for each of said slots, said transverse frame members being frictionally engaged in said slots to hold the corrugated strips in assembled relation, the said transverse frame members being located in the face of said filter cell and projecting forwardly from the face of said cell to space the instant cell from any adjacent cell, and form a dead air space between them, and a layer of adhesive carried by said frame members and adapted to engage and secure the edges of all parts of the corrugated strips in said slots to said frame members, all of said frame members being secured at one end to an end frame member engaging the end of the stack and at the other end to a second end frame member engaging the other end of the stack of corrugated strips, said end frame members being provided with aligned slots for receiving the transverse frame members.

14. A filter cell comprising a plurality of narrow strips of single face corrugated paper arranged in a stack, with corrugations of each sheet engaging the liner of the adjacent sheet, and the corrugations extending diagonally with respect to the edges of said strips, said corrugated sheets being provided with a plurality of aligned slots and a plurality of transverse frame members, one for each of said slots, said transverse frame members being frictionally engaged in said slots to hold the corrugated strips in assembled relation, the said transverse frame members being located in the face of said filter cell and projecting forwardly from the face of said cell to space the instant cell from any adjacent cell, and form a dead air space between them, and a layer of adhesive carried by said frame members and adapted to engage and secure the edges of all parts of the corrugated strips in said slots to said frame members, all of said frame members being secured at one end to an end frame member engaging the end of the stack and at the other end to a second end frame member engaging the other end of the stack of corrugated strips, said end frame members being provided with aligned slots for receiving the transverse frame members, and said transverse frame members being of a greater width than the depth of the slots, whereby the transverse frame members project from the face of the assembly to space the assembly from similar units.

15. In an air filter assembly, the combination of a plurality of layers of corrugated paper strips, each strips consisting of a supporting layer and a corrugated layer, the corrugations extending substantially diagonally to the external planes of the assembly, said corrugated strips being slotted in their edges to receive a plurality of frictionally held supporting frame members, said frame members projecting from the assembly of strips to space each filter cell from adjacent filter cells, a plurality of such cells arranged with the diagonally extending corrugations successively arranged transversely to each other and successively increasing in size, an external edge frame surrounding the assembly of filter cells and having inwardly extending housing flanges engaging the outer faces of the assembly, and metallic securing means extending through the filter cells and through the inwardly extending flanges thereof to secure the assembly together with the spaced cells spaced from each other to provide intermediate expansion air spaces.

CHARLES G. LAMB.